April 9, 1968 R. T. ROGERS 3,377,582
MAGNETIC TOROIDAL CORE HAVING SUCCESSIVE WINDINGS WITH THE PAIR OF LEAD ENDS OF EACH WINDING SPACED FROM THE PAIR OF LEAD ENDS OF EACH OTHER WINDING
Filed Aug. 21, 1964 4 Sheets-Sheet 1

INVENTOR.
ROLAND T. ROGERS
BY Richard A. Craig
ATTORNEY

INVENTOR.
ROLAND T. ROGERS
BY Richard A Craig
ATTORNEY

INVENTOR.
ROLAND T. ROGERS
BY Richard A. Craig
ATTORNEY

April 9, 1968 R. T. ROGERS 3,377,582

MAGNETIC TOROIDAL CORE HAVING SUCCESSIVE WINDINGS WITH THE PAIR OF LEAD ENDS OF EACH WINDING SPACED FROM THE PAIR OF LEAD ENDS OF EACH OTHER WINDING

Filed Aug. 21, 1964 4 Sheets-Sheet 4

INVENTOR.
ROLAND T. ROGERS
BY Richard A. Craig
ATTORNEY

United States Patent Office 3,377,582
Patented Apr. 9, 1968

3,377,582

MAGNETIC TOROIDAL CORE HAVING SUCCESSIVE WINDINGS WITH THE PAIR OF LEAD ENDS OF EACH WINDING SPACED FROM THE PAIR OF LEAD ENDS OF EACH OTHER WINDING

Roland T. Rogers, Butler, N.J., assignor to Elastic Stop Nut Corporation of America, Union, N.J., a corporation of New Jersey Filed Aug. 21, 1964, Ser. No. 391,104
4 Claims. (Cl. 340—174)

ABSTRACT OF THE DISCLOSURE

A magnetic memory device having a toroidal core of high permeability, magnetic material having a square hysteresis loop, more than two windings, each of which has a pair of lead ends, wound over substantially all the circumference of the toroidal core so that each of the subsequent windings overlies each of the previous windings, the pair of lead ends of each winding being circumferentially spaced around the toroidal core from the pair of lead ends of each other winding.

The invention relates to magnetic memory devices. In particular, the magnetic memory devices of the invention comprise a plurality of windings wound on a core of high permeability, square loop, magnetic material wherein subsequent windings overlie the prior ones and each of the windings is wound over substantially all the circumference of the core to obtain maximum coupling with the core.

Prior art magnetic memory devices were wound so that each coil was linked to only a portion of the magnetic core. Consequently, the coupling between the core and the windings was not at a maximum. Counters of the prior art, of the decade type or on other bases, were such that the several circuits were coupled both electrically and magnetically and it was not possible to isolate them electrically so as to eliminate the effect of induced external noise on the circuit and the effect thereof on the operation of the counter.

It is an important object of the invention to provide a magnetic memory device wherein the windings are wound one over the other and over substantially all the circumference of the magnetic core.

It is a further object of the invention to provide such a magnetic memory device wherein the pairs of leads of the several windings are spaced apart around the circumference of the magnetic core.

These and other objects, advantages, features and uses will be apparent during the course of the following description when taken in conjunction with the accompanying drawings, wherein:

FIGURE 9 is a block diagram of a plurality of counters connected in cascade for use, for example in a digital counter.

Figure 1:
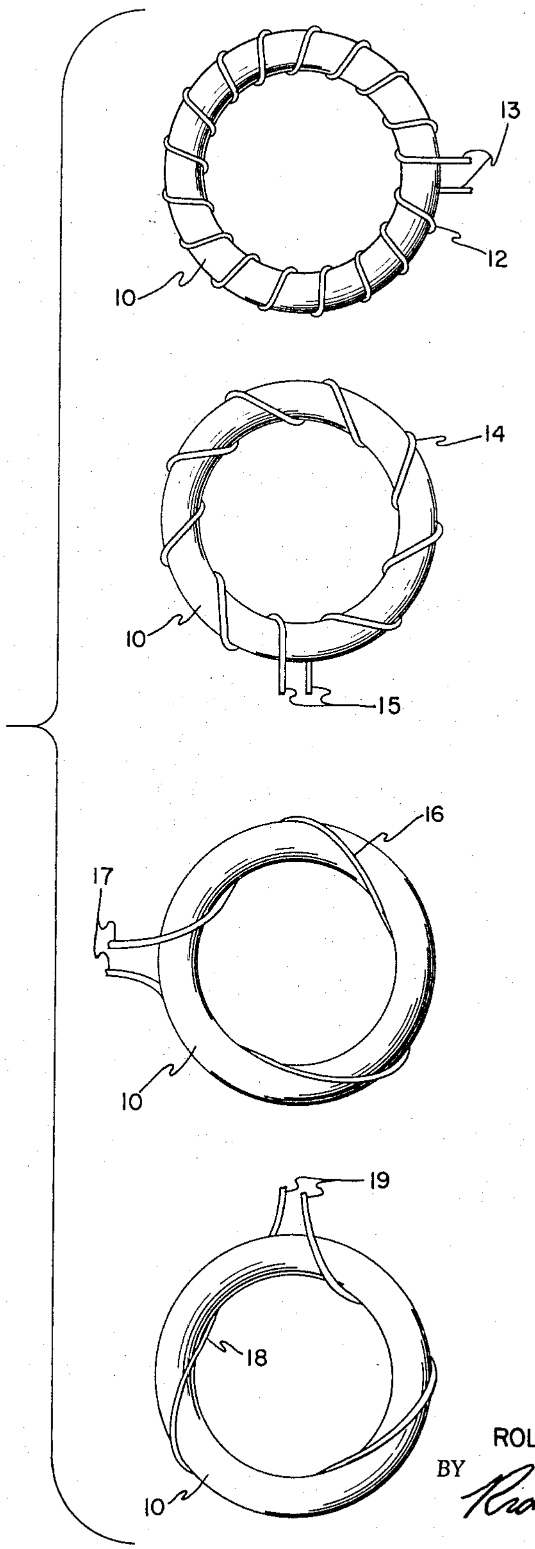
FIGURE 1 is a group of four plan views showing the placement of the successive windings on the magnetic toroidal core.

In the drawings, wherein, for the purpose of illustration, are shown preferred embodiments of the invention and wherein like numerals are employed to designate like parts throughout the same, the numeral 10 designates the core of the magnetic memory device of the invention. Core 10 is preferably toroidal in shape and is formed of high permeability magnetic material having a square hysteresis loop, an example of such material being commercially available under the name "Orthonol" (a trade name of Magnetics Incorporated). FIGURE 1 comprises four views of the core 10 showing the positioning of the several windings 12, 14, 16 and 18 and their respective pairs of leads 13, 15, 17 and 19.

Figure 2:
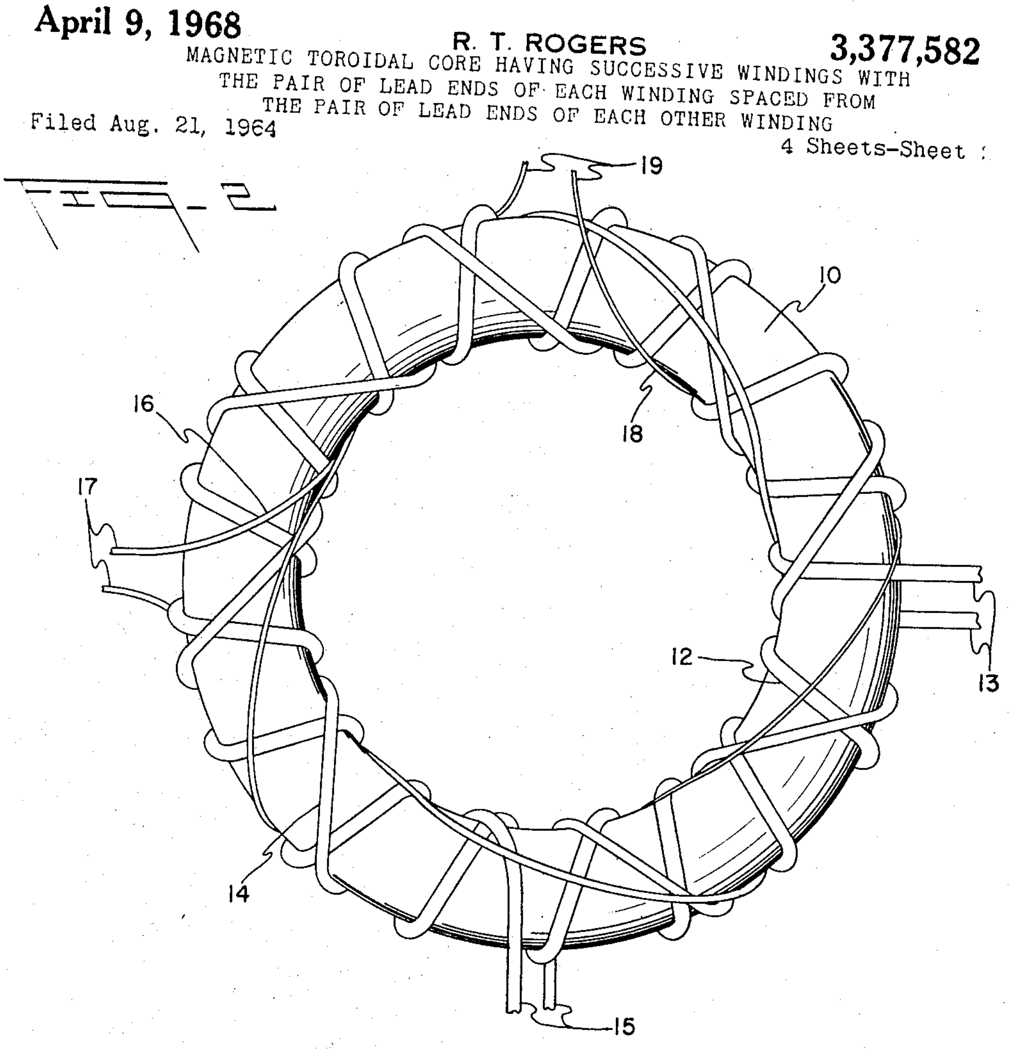
FIGURE 2 is a plan view of the magnetic memory device showing the four windings wound on the core.

Each winding is wound around substantially all the circumference of toroidal core 10 so that maximum coupling is obtained between the core and the windings. FIGURE 2 is a plan view similar to that of FIGURE 1 showing the plurality of windings wound on the core. The pairs of leads 13, 15, 17 and 19 are successively spaced about 90° apart to facilitate mounting of the device and simplify separation of the leads and the making of connection to them.

Broadly, successive pulses are applied to primary winding 12 until core 10 saturates. The system is designed so that core 10 saturates after a predetermined number of pulses (the count series) as been applied to the primary winding. In a decimal system, this occurs on the tenth pulse, in a base 12 system, saturation occurs on the twelfth pulse and in a base 8 system, saturation occurs on the eighth pulse.

When the core saturates, the flyback exceeds the threshold value of the output stage and turns it on. This causes an output pulse to be transmitted by the system. This output pulse may be fed to a subsequent counting stage or to a display or to both. The output pulse may also be utilized to actuate a circuit for timing or other purposes. During the transmission of the output pulse, a reset winding on the core serves to reset the core to make ready for the next series of pulses. At the end of the output pulse, the reset winding 14 on the core serves to turn off the output stage.

In order to compensate for the reduction of area of the count pulse resulting from increased temperature, a compensating network is employed. This network serves to increase the area of the input pulse so that the core will still saturate with the same number of input pulses regardless of temperature.

It can be seen that the windings 12, 14, 16 and 18 are all coupled to each other as well as to the core 10. However, the turns-ratios are such that the pulses appearing across the various secondary windings during counting are much lower in amplitude than the pulse across these same windings at the end of each count series when the output pulse is transmitted.

Figure 3:
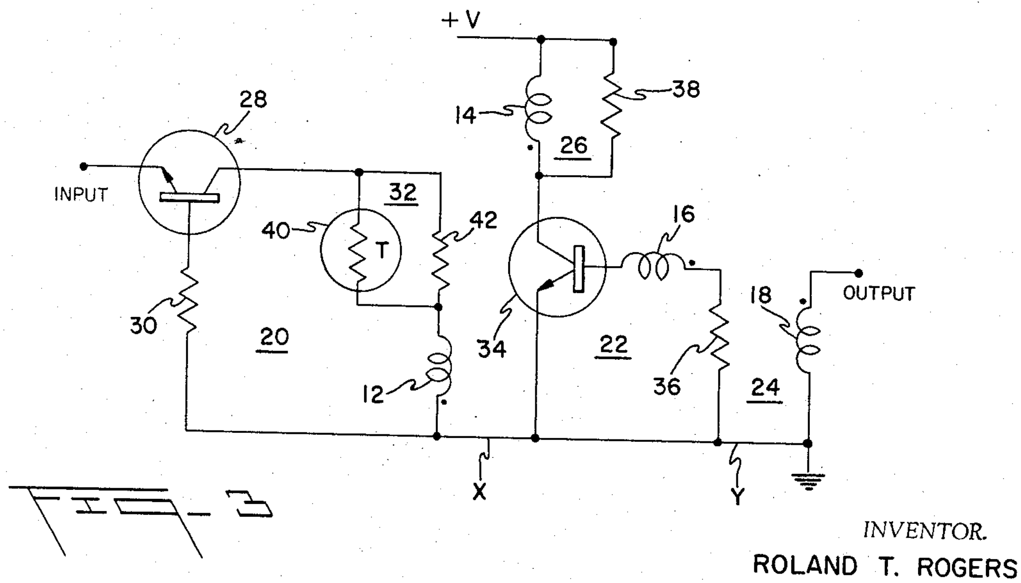
FIGURE 3 is a schematic circuit diagram of a counter utilizing the magnetic memory device of FIGURES 1 and 2.

In FIGURE 3, there is illustrated a counter circuit which utilizes the magnetic memory device of the invention. The circuit comprises input means 20 to which the input pulses are applied, switching means 22 from the output of which the output pulse is transmitted, output means 24 and reset circuit 26. The counter is illustrated with all elements thereof connected to a common equipment ground but they may be electrically isolated from each other by breaking the connections on the lines marked X and Y in FIGURE 3. This permits considerable circuit flexibility, in that portions of the circuit may be electrically isolated from other portions of the circuit so that the only coupling between them is magnetic. Moreover, with this circuit it is also possible to have one portion of the circuit floating and another portion at earth ground. This flexibility may be used to eliminate the effect of induced external noise on the circuit and its adverse effect on the output.

Input means 20 comprises transistor 28 preferably of the N-P-N silicon type, base drive resistor 30, input winding 12 and temperature compensating network 32. Pulses are applied to the emitter of transistor 28 which conducts so that a pulse is induced across winding 12. The pulse across winding 12 partially magnetizes core 10 in a manner to be described in detail later in this specification.

Switching means 22 comprises transistor 34 preferably of the N-P-N silicon type connected as a common emitter blocking oscillator. Transistor 34 is off during the count series while the pulses are being applied to the emitter of transistor 28. When the core saturates on the *n*th pulse the flyback voltage on winding 16 exceeds the threshold value of transistor 34, and transistor 34 is turned on. Now an output pulse appears across base drive resistor 36 and across output winding 18. If a group of counters are connected in cascade, the output from winding 18 is applied to the input of the next counter. If the counter is in the last stage of a system, the output may be taken across resistance 36 and the winding 18 may be omitted or left unused.

When transistor 34 is turned on a large pulse appears across winding 14 which is opposite in polarity to the input pulses and which applies a negative voltage of sufficient amplitude to drive the core to negtive saturation and to turn off transistor 34. The counter is now ready to receive another series of counting pulses. Resistor 38, a damping resistor, is connected in parallel with winding 14.

Figure 4:
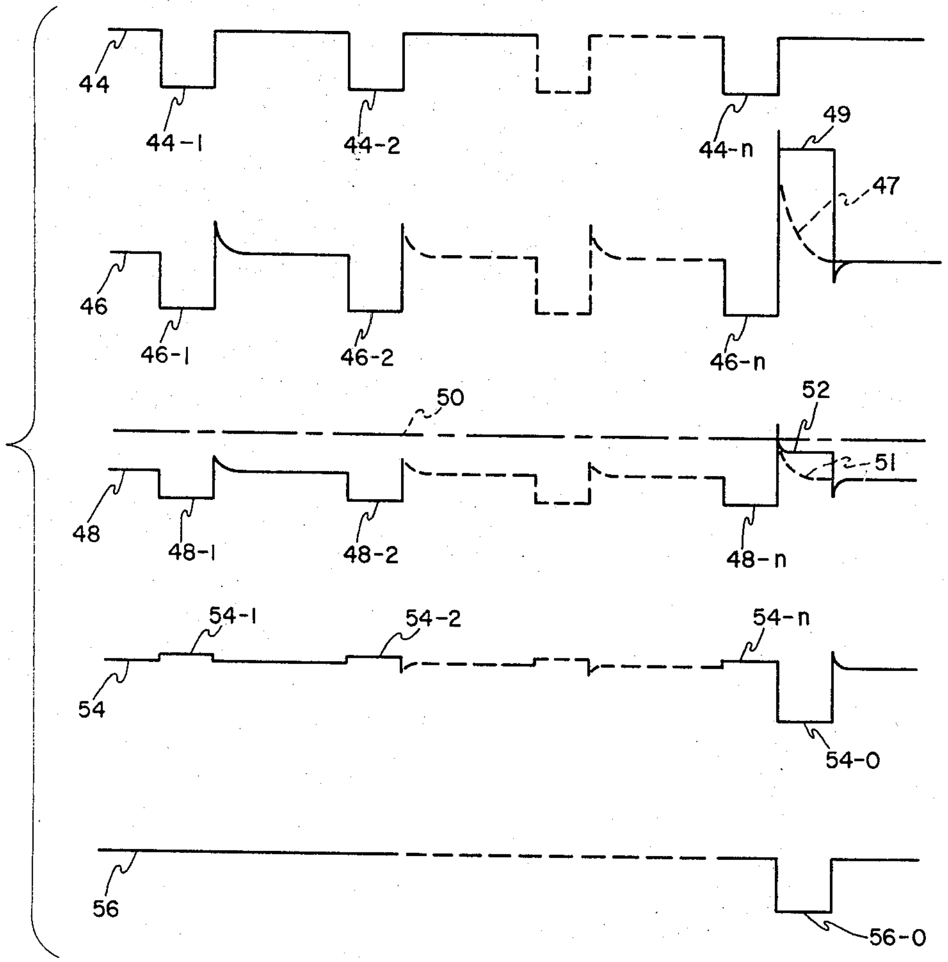
FIGURE 4 is a group of plots of the voltage wave shapes at selected points in the circuit of FIGURE 3.

In order to understand the operation of the counter of FIGURE 3, reference is made to the pulse diagrams illustrated in FIGURE 4. Curve 44 is a plot of voltage against time for the input pulses. The first input pulse is designated 44–1, the second is designated 44–2 and the *n*th pulse, on which core saturation occurs, is designated **44–*n*. Curve 46 is a plot of the pulses across winding 12. These pulses are designated 46–1, 46–2 . . . 46–*n*. The flyback 47** on the *n*th pulse is masked by the reset pulse 49 which is induced in winding 12 by the action of the reset circuit 26.

Curve 48 is a plot of the pulses across winding 16 showing the pulses 48–1, 48–2 . . . **48–*n* induced in winding 16 by the counting pulses in winding 12. Line 50 designates the threshold of transistor 34 which turns on if the voltage applied to its base exceeds this value. The flyback 51 is masked by the reset pulse 52 which is triggered by the leading edge of the flyback when the voltage on transistor 34** exceeds its threshold level.

Curve 54 is a plot of the pulses across winding 18 showing the pulses 54–1, 54–2 . . . **54–*n* induced in winding 18 by the counting pulses in winding 12. Pulse 54–*o* designates the output pulse which is fed to the next counter stage and/or to a digital or other display. Curve 56 is a plot of the voltage across resistor 36 showing the output pulse 56–*o*** which may be fed to a digital or other display.

Figure 5:
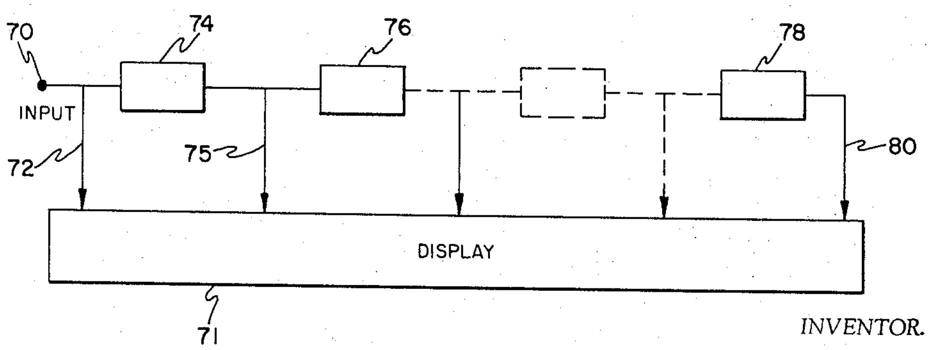
FIGURES 5 through 8 are plots of flux against current to illustrate the action of the temperature compensation circuit used in the counter of FIGURE 3.
Figure 5:
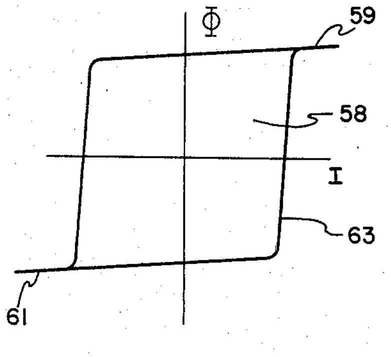

FIGURE 5 is a plot of flux $\phi$ against current $i$ and illustrates the hysteresis curve 58 of core 10 at room temperature. Now, consider the illustration of FIGURE 6 which shows the condition after an input count pulse has been applied to winding 12. The input pulse raises the core to a partially switched condition (point 60) and the flyback moves the core condition to point 62. Shaded area 64 represents the loss of switched flux due to the flyback.

Figure 6:
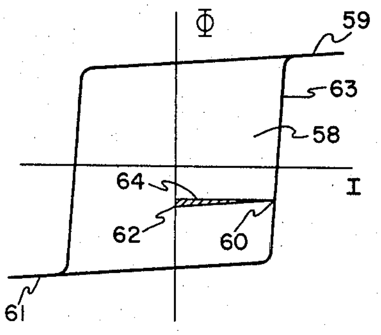

The plots of FIGURES 5 and 6 serve to illustrate the core condition during operation of counters of the invention. As each successive count pulse is applied to winding 12, the core assumes successively higher positions along edge 63. At each flyback, a small amount of area is subtracted from the switched flux of the core as the core condition is represented by higher and higher values along the $\phi$-axis. When the core saturates after the *n*th pulse, its condition is represented by positive saturation as shown at 59. When the reset pulse is transmitted, the core is driven to negative saturation as shown at 61.

Figure 7:
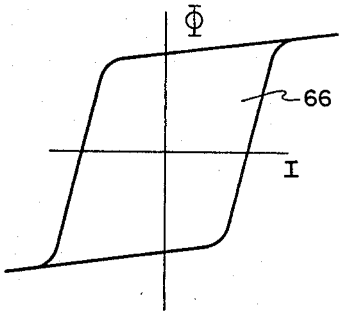
Figure 8:
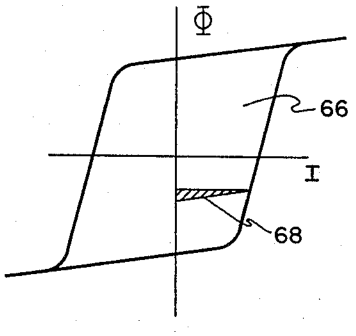

FIGURE 7 is a plot similar to that of FIGURE 5 in which the shape of the core hysteresis curve 58 is altered to that of curve 66 due to increase in temperature. In FIGURE 8, it can be seen that area 68, which is subtracted by the flyback, is much greater than area 64 (lower temperature). If this condition is permitted to go uncorrected, the core will saturate on different pulse counts and the number of input count pulses necessary to transmit an output pulse will increase as the temperature increases. Such a condiiion cannot be tolerated.

Temperature correction is achieved by increasing the area of each count pulse as the temperature increases. This is accomplished by means of temperature compensating network 32 (FIGURE 3). Temperature compensating network 32 comprises thermistor 40 which has a negative temperature coefficient of resistance in parallel with resistor 42. As the temperature rises, the resistance of network 32 drops so that the voltage drop across winding 12 increases and the area of each count pulse in the core hysteresis loop increases. The values of thermistor 40 and resistor 42 are chosen so that the core will always saturate on the *n*th pulse within the operating temperature range to which the counter will be subjected.

In FIGURE 9 there is shown a block diagram of a digital counter using a plurality of counters of the invention connected in cascade. Obviously, the same system may be used for binary, base-8, base-12, or any other base count. The display may be a visual display, a storage register of a computer or any other suitable means for utilizing the signals from the system. Input pulses are applied to input terminal 70 so as to place a signal on line 72 to display 71 and the input of counter 74. After ten pulses are applied to counter 74, it applies a pulse to line 75 to the display 71 and to the input of counter 76. This process continues to the last counter 78 and its output line 80. The output from each counter of FIGURE 9 to the display 71 is taken by means of a high impedance connection of the order of 1000 ohms across resistor 36. This high impedance puts a minimum load on the output winding 18 so as to avoid affecting the input to the next succeeding counter.

As various changes could be made in the above constructions without departing from the scope of the invention, it is intended that all matter contained in the above descripion or shown in the accompanying drawings shall be interpreted as illustrative and not in a limiting sense.

What is claimed is:

1. A magnetic memory device comprising:
a toroidal core of high permeability, magnetic material having a square hysteresis loop; and
more than two windings each having a pair of lead ends and wound successively around substantially all the circumference of the toroidal core so that each of the subsequent windings overlies each of the previous windings;
the pair of lead ends of each winding being circumferentially spaced around the toroidal core from the pair of lead ends of each other winding.

2. A mangetic memory device as described in claim 1 wherein there are at least four windings.

3. A magnetic memory device as described in claim 1 wherein there are four windings and the pair of lead ends of each subsequently applied winding is spaced about 90° from that of a previously applied winding.

4. A magnetic memory device as described in claim 1 wherein there are only four windings.

References Cited

UNITED STATES PATENTS

| | | | |
|---|---|---|---|
| 3,164,811 | 1/1965 | Boylan et al. | 340—174 |
| 3,168,715 | 2/1965 | Woodworth | 336—170 X |
| 3,280,363 | 10/1966 | Powell | 336—170 X |
| 3,293,622 | 12/1966 | Pricer et al. | 340—174 |
| 3,305,800 | 2/1967 | Velsink | 336—170 X |

TERRELL W. FEARS, *Primary Examiner.*

STANLEY M. URYNOWICZ, *Examiner.*